United States Patent
Colborn (10) Patent No.: US 6,746,790 B2
(45) Date of Patent: Jun. 8, 2004

(54) POWER SYSTEM INCLUDING HEAT REMOVAL UNIT FOR PROVIDING BACKUP POWER TO ONE OR MORE LOADS

(75) Inventor: Jeffrey A. Colborn, Cardiff-by-the-Sea, CA (US)

(73) Assignee: Metallic Power, Inc., Carlsbad, CA (US)

( * ) Notice: Subject to any disclaimer, the term of this patent is extended or adjusted under 35 U.S.C. 154(b) by 242 days.

(21) Appl. No.: 09/930,557

(22) Filed: Aug. 15, 2001

(65) Prior Publication Data

US 2003/0035985 A1 Feb. 20, 2003

(51) Int. Cl.[7] .......................... H01M 8/04; H01M 8/18; H01M 12/06; H02J 9/00
(52) U.S. Cl. ........................ 429/26; 429/13; 429/19; 429/22; 429/27; 307/64
(58) Field of Search ......................... 429/13, 17, 19, 429/21, 22, 23, 26, 27; 307/64, 65, 66

(56) References Cited

U.S. PATENT DOCUMENTS

| | | |
|---|---|---|
| 2,843,806 A | 7/1958 | O'Neill |
| 3,290,176 A | 12/1966 | Berju et al. ................. 316/160 |
| 3,395,047 A | 7/1968 | Terry et al. |
| 3,716,413 A | 2/1973 | Eisner |
| 3,964,930 A | 6/1976 | Reiser |
| 4,177,327 A | 12/1979 | Mathews et al. ............. 429/27 |
| 4,257,552 A | 3/1981 | Farkas et al. .................. 236/1 |
| 4,324,844 A | 4/1982 | Kothmann ................... 429/26 |
| 4,475,152 A | 10/1984 | Ikegame et al. ............ 363/141 |
| 4,728,808 A | 3/1988 | Bet-Esh et al. .............. 307/66 |
| 4,735,871 A | 4/1988 | Descroix et al. ............. 429/26 |
| 4,774,631 A | 9/1988 | Okuyama et al. ........... 361/384 |
| 4,824,740 A | 4/1989 | Abrams et al. .............. 429/24 |
| 4,913,983 A | 4/1990 | Cheiky ........................ 429/13 |
| 4,957,826 A | 9/1990 | Cheiky ........................ 429/27 |
| 5,041,344 A | 8/1991 | Kamoshita et al. ........... 429/26 |
| 5,082,753 A | 1/1992 | Shimizu et al. ............... 429/26 |
| 5,136,856 A | 8/1992 | Yamamoto et al. ........... 62/176 |
| 5,237,484 A | 8/1993 | Ferchau et al. ............. 361/689 |
| 5,354,625 A | 10/1994 | Bentz et al. .................. 429/17 |
| 5,424,143 A | 6/1995 | Shrim ......................... 429/26 |
| 5,467,607 A | 11/1995 | Harvey ........................ 62/186 |
| 5,469,331 A | 11/1995 | Conway et al. ............. 361/716 |
| 5,483,108 A | 1/1996 | Girard et al. ................ 307/64 |
| 5,487,955 A | 1/1996 | Korall et al. ................. 429/26 |
| 5,547,776 A | 8/1996 | Fletcher et al. .............. 429/13 |
| 5,565,716 A | 10/1996 | Tierney, Jr. ................. 307/154 |
| 5,582,929 A | 12/1996 | Dechovich ................... 429/26 |
| 5,657,641 A | 8/1997 | Cunningham et al. ........ 62/263 |
| 5,753,384 A | 5/1998 | Kimberg ..................... 429/27 |
| 5,777,398 A | 7/1998 | Valkeakari et al. ........... 307/66 |
| 5,790,391 A | 8/1998 | Stich et al. .................. 363/24 |
| 5,801,937 A | 9/1998 | Gold et al. ................. 363/141 |
| 5,815,370 A | 9/1998 | Sutton ........................ 361/699 |
| 5,844,328 A | 12/1998 | Furst .......................... 307/66 |
| 5,904,999 A | 5/1999 | Kimberg et al. ............. 429/27 |
| 5,952,117 A | 9/1999 | Colborn et al. .............. 429/27 |

(List continued on next page.)

FOREIGN PATENT DOCUMENTS

| | | |
|---|---|---|
| EP | 0 700 110 A1 | 3/1996 |
| WO | WO 99/16145 | 4/1999 |

*Primary Examiner*—Bruce F. Bell
*Assistant Examiner*—Jonathan Crepeau
(74) *Attorney, Agent, or Firm*—Howrey Simon Arnold & White, LLP (57) ABSTRACT

A fuel cell system is described for providing backup power to one or more loads (including without limitation a cooling unit) upon the occurrence of a power outage condition, which includes a disruption or discontinuation in the delivery of primary power (i.e., power from a primary source, namely, a source other than the fuel cell system) to the one or more loads.

3 Claims, 10 Drawing Sheets

U.S. PATENT DOCUMENTS

| | | | |
|---|---|---|---|
| 5,958,210 A | 9/1999 | Siu et al. | 205/602 |
| 5,972,530 A | 10/1999 | Shelekhin et al. | 429/26 |
| 5,982,652 A | 11/1999 | Simonelli et al. | 363/142 |
| 6,011,324 A | 1/2000 | Kohlstruck et al. | 307/64 |
| 6,124,051 A | 9/2000 | Johnson | 429/26 |
| 6,151,212 A | 11/2000 | Schwenk et al. | 361/695 |
| 6,153,328 A | 11/2000 | Colborn | 429/51 |
| 6,157,168 A | 12/2000 | Malik | 320/128 |
| 6,162,555 A | 12/2000 | Gutierrez et al. | 429/15 |
| 6,167,947 B1 | 1/2001 | Hokanson et al. | 165/80.3 |
| 6,180,273 B1 | 1/2001 | Okamoto | 429/26 |
| 6,190,792 B1 | 2/2001 | Faris et al. | 429/27 |
| 6,194,793 B1 | 2/2001 | Fisher, Jr. | 307/66 |
| 6,204,574 B1 | 3/2001 | Chi | 307/66 |
| 6,228,519 B1 | 5/2001 | Faris et al. | 429/27 |
| 6,232,006 B1 | 5/2001 | Breault | 429/26 |
| 6,242,121 B1 | 6/2001 | Pedicini et al. | 429/27 |

POWER SYSTEM INCLUDING HEAT REMOVAL UNIT FOR PROVIDING BACKUP POWER TO ONE OR MORE LOADS

RELATED APPLICATION

This application is related to U.S. patent application Ser. No. 09/930,394, entitled "METAL FUEL CELL SYSTEM FOR PROVIDING BACKUP POWER TO ONE OR MORE LOADS," filed concurrently herewith, and owned in common by the Assignee hereof, which is hereby fully incorporated by reference herein as though set forth in full.

FIELD OF THE INVENTION

This invention relates generally to uninterruptible power supplies for providing backup power to electrical equipment during power outages, and, more specifically, to uninterruptible power supply systems based on metal- or hydrogen-fuel cells.

RELATED ART

A great deal of electronic equipment in the modern world relies upon high-quality, reliable electrical power. Such equipment, each a load, includes, for example and without limitation, telecommunications equipment, Internet servers, corporate mail servers, routers, power supplies, computers, test and industrial process control equipment, alarm and security equipment, many other types of electrical devices, equipment for which a power source is necessary or desirable to enable the equipment to function for its intended purpose, and the like, and suitable combinations of any two or more thereof. Over the past decade, as the digital age has taken hold, there has been an explosive growth in the deployment of such equipment.

For many applications of such equipment, power outages can lead to losses of data, equipment damage, missed deadlines, and/or lost productivity, and therefore must be avoided. At the same time, the reliability of the traditional power generation, transmission, and distribution network has fallen in some countries due in part to the increased demands which have been placed on this network throughout the world. The result is that uninterruptible power supplies (UPS) have emerged as a means for providing backup power to such equipment in the event of a power outage.

Traditionally, UPSs use lead-acid batteries as the energy source. Such UPSs typically provide up to about 20 minutes of backup power, which is usually enough time to allow users to shut down their equipment in an orderly fashion, but not enough time to allow the equipment to operate through all power outages. Backup times much longer than this are usually not considered feasible as the required UPSs would be too heavy and bulky.

Even if backup times much beyond 20 minutes were even feasible, another problem that would have to be addressed is the heat generated by the consumption of the backup power by the electrical equipment. In a typical scenario, such heat is generally dissipated into a "computer room" or "communications closet" in which the equipment is housed. Under normal conditions, such areas are typically cooled with an electrical air conditioning system. However, during a power outage, the electrical air conditioning system servicing such areas is typically down. Moreover, backup generators located outside the building and running on diesel fuel, propane, or natural gas are often not feasible for purposes of providing backup power to the air conditioning system because they tend to be expensive, bulky, have adverse environmental impacts, and frequently do not service power outages that occur internal to a building and affect only parts of it.

SUMMARY

The invention provides a fuel cell system for providing backup power to one or more loads (including without limitation a cooling unit) upon the occurrence of a power outage condition, defined to include a disruption or discontinuation in the delivery of primary power (i.e., power from a primary source, namely, a source other than the fuel cell system) to the one or more loads. The system comprises one or more fuel cells, each comprising a power source and a fuel storage unit, that deliver backup power to the one or more loads upon the occurrence of a power outage condition. In one aspect, the invention further provides that each fuel cell can optionally further comprise a regeneration unit to regenerate the reactants of the fuel from the reaction products, and/or a reaction product storage unit to store the reaction products from the fuel cell, and/or a second reactant storage unit to store the second reactants. The one or more fuel cells can be metal fuel cells (including without limitation zinc fuel cells, aluminum fuel cells, lithium fuel cells, magnesium fuel cells, iron fuel cells, and the like), hydrogen fuel cells, and/or any other fuel cells that have the same purpose.

In a further embodiment, the fuel cell useful in the practice of the invention system comprises a metal fuel cell. In another aspect, a metal fuel cell system for providing backup power to one or more loads (including without limitation a cooling unit) upon the occurrence of a power outage condition has one, or any suitable combination of two or more, of the following properties: the system can be configured to not utilize or produce significant quantities of flammable fuel or product, respectively; the system can provide backup power to the one or more loads for an amount of time limited only by the amount of fuel present (e.g., in the range(s) from about 0.01 hours to about 10,000 hours or more); the system can be configured to have an energy density in the range(s) of about 35 Watt-hours per kilogram of combined fuel and electrolyte added to about 400 Watt-hours per kilogram of combined fuel and electrolyte added; the system can further comprise an energy requirement, and can be configured such that the combined volume of fuel and electrolyte added to the system is in the range(s) from about 0.0028 L per Watt-hour of the system's energy requirement to about 0.025 L per Watt-hour of the system's energy requirement; the system can be configured to have a fuel storage unit that can store fuel at an internal pressure in the range(s) from about −5 pounds per square inch (psi) gauge pressure to about 200 psi gauge pressure; the system can be configured to hold a pre-charge of fuel in the power producing cell(s) of the power source of the metal fuel cell, optionally in an amount sufficient to permit operative engagement of the fuel cell(s) at a rate significantly faster than when no such fuel is present and/or sufficient to supply power for a time in the range(s) of about 0.001 minutes to about 100 minutes or more without additional fuel being added; and the system can be configured to expel substantially no reaction products outside of the system (e.g., into the environment).

The system further optionally comprises a controller that, upon sensing the occurrence of a power outage condition, operatively engages the one or more metal fuel cells and/or engages a flow of the one or more second reactants at a time prior to in the range(s) from about 10 microseconds to about 10 seconds after the controller senses the occurrence of a power outage condition. Optionally, the controller can be configured to sense a cessation of the power outage condition and, responsive thereto, to engage the primary power to provide power to one or more of the optional regeneration units in the one or more fuel cells and/or to disengage the one or more fuel cells from providing power to the one or more loads. The system can also optionally further comprise a power converter to convert to alternating current (AC), or to another form of direct current (DC), the DC power output by the one or more fuel cells.

The system further comprises a cooling unit that is powered by the one or more fuel cells upon the occurrence of a power outage condition. This cooling unit is configured to remove from the vicinity of the system heat generated by the one or more loads and/or the one or more fuel cells.

In one embodiment, the cooling unit is configured to blow cool fluid (for example and without limitation, gas (e.g., air), liquid (e.g., liquid coolant), and the like, and suitable combinations thereof) past the one or more fuel cells and/or the one or more loads. In a second embodiment, the cooling unit is an open loop system configured to cool a first cooling fluid (e.g., air) by circulating a second cooling fluid (e.g., liquid coolant) through a heat exchanger. The first cooling fluid is then blown past the one or more fuel cells and/or the one or more loads. In a third embodiment, the cooling unit is a closed loop system configured to cool a first cooling fluid (e.g., air) by circulating a second cooling fluid (e.g., liquid coolant) from a reservoir (not in the immediate vicinity of the system) through a heat exchanger and then back to the reservoir. The first cooling fluid is then blown past the one or more fuel cells and/or the one or more loads.

In one implementation, the system of the invention further optionally comprises means for physically supporting the one or more fuel cells, and at least one of the one or more loads, and/or means for routing a cooling fluid, whether gas, liquid, or both gas and liquid, past the one or more fuel cells and/or the one or more loads. Optionally, the means for supporting can be configured to support one or more of the remainder of the one or more loads, the controller, and/or the optional power conversion stage.

Each of these two means, as well as each of the other components of the system, can be separate from, or integral with, one or more of the other components of the system.

In another embodiment, the invention provides a method of providing backup power to one or more loads and to a cooling unit.

In addition, the invention provides methods of providing backup power to one or more loads (including without limitation a cooling unit) comprising, upon sensing an outage of primary power to the one or more loads, operatively engaging one or more metal fuel cells to provide power to the one or more loads. The invention also provides methods of pre-charging a fuel cell system for providing backup power to one or more loads (including without limitation a cooling unit) comprising placing an amount of fuel in cell cavities of a power source of a fuel cell system prior to operative engagement of the fuel cell system. The invention further provides methods of utilizing a pre-charged fuel cell system for providing backup power to one or more loads (including without limitation a cooling unit), comprising operatively engaging a fuel cell system containing fuel in cell cavities of a power source of the fuel cell system prior to its operative engagement for a time in the range from about 0.001 minutes to about 100 minutes without adding additional fuel thereto.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1A:
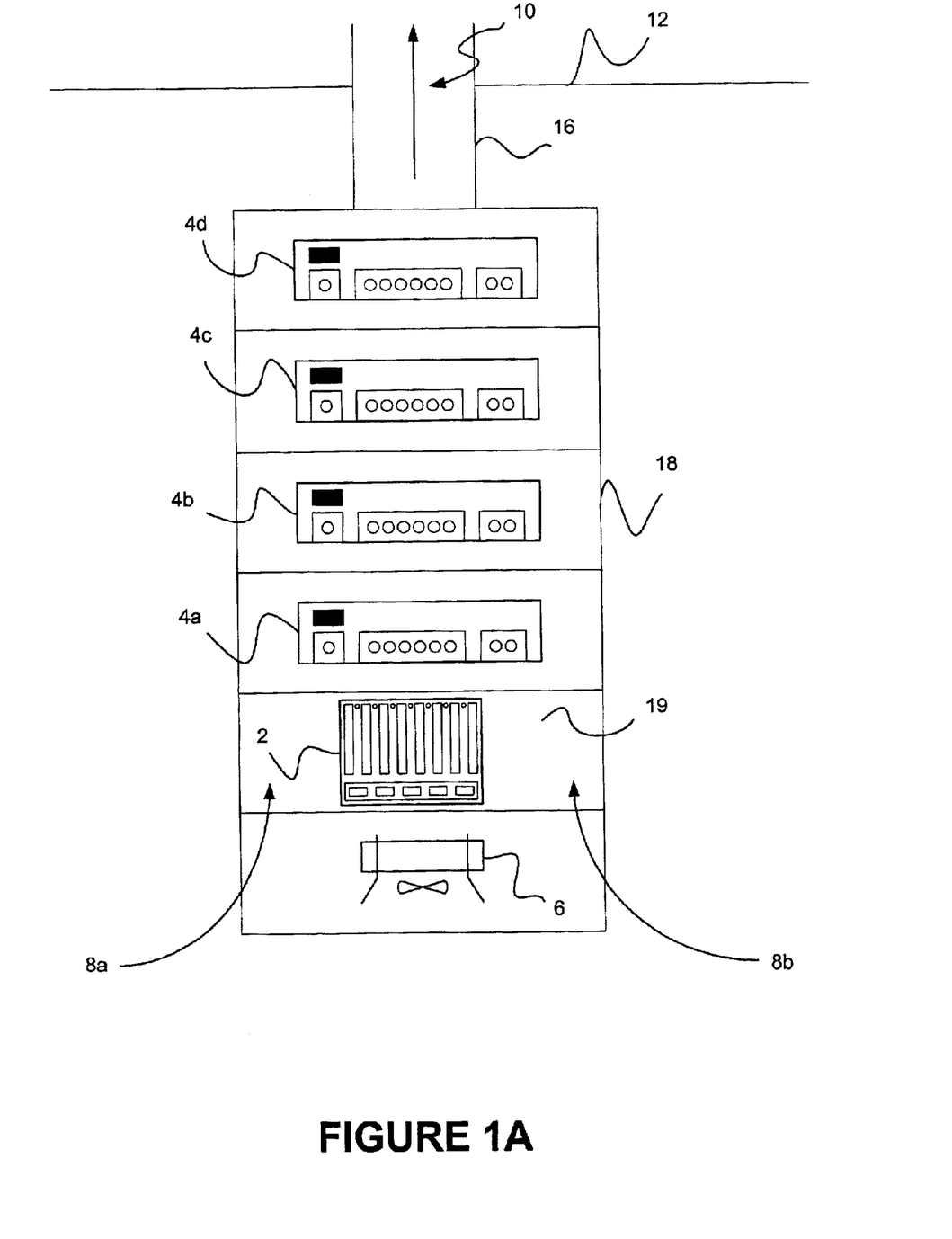
FIG. 1A is a front view of a first embodiment of a fuel cell system according to the invention in which the cooling fluid is air.

A front view of a first embodiment of a system according to the invention is illustrated in FIG. 1A. The system comprises one or more fuel cells 2 that are configured to provide backup power to one or more loads 4a, 4b, 4c, 4d in the event of a power outage condition.

Figure 1B:
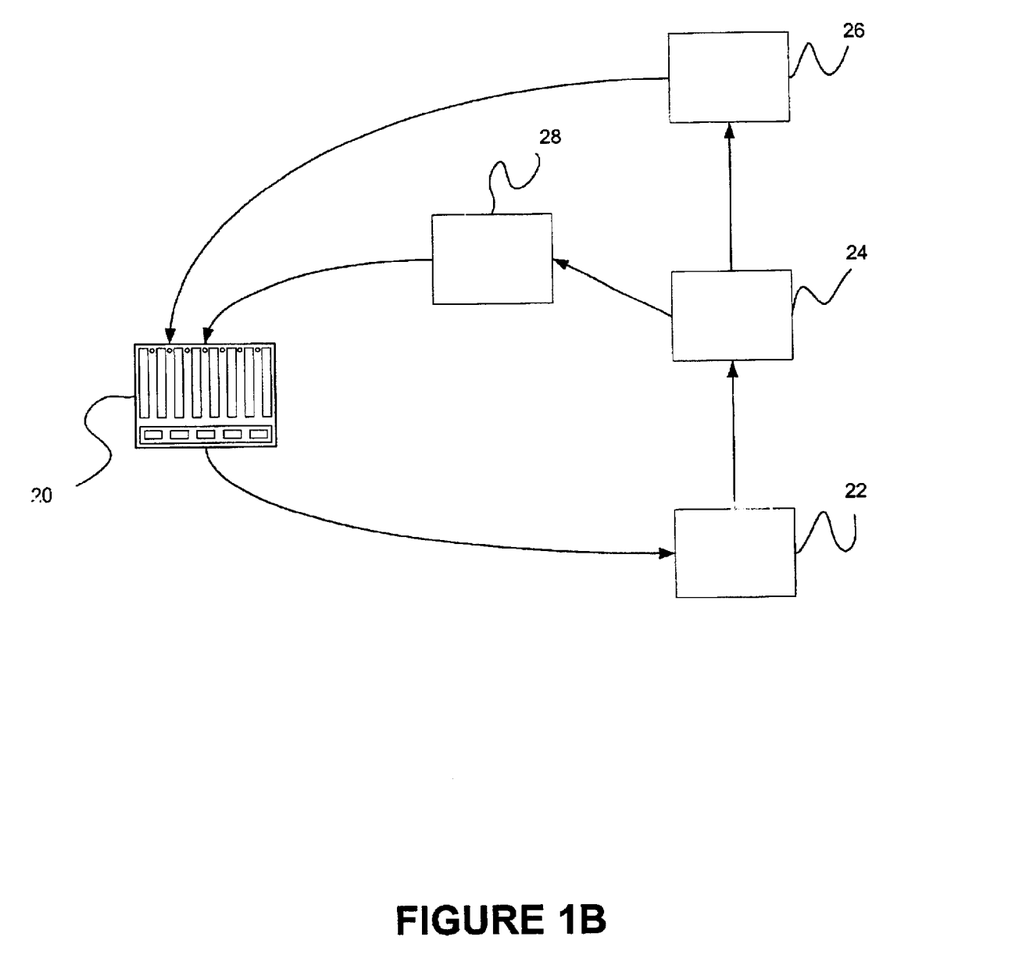
FIG. 1B is a block diagram of a fuel cell.

A block diagram of one of these fuel cells is illustrated in FIG. 1B. As illustrated, the fuel cell comprises a power source 20, an optional reaction product storage unit 22, an optional regeneration unit 24, a fuel storage unit 26, and an optional second reactant storage unit 28. The power source 20 in turn comprises one or more cells each having a cell body defining a cell cavity, with an anode and cathode situated in each cell cavity. The cells can be coupled in parallel or series. In one implementation, they are coupled in series to form a cell stack.

The anodes within the cell cavities in power source 20 comprise the fuel stored in fuel storage unit 26. Within the cell cavities of power source 20, an electrochemical reaction takes place whereby the anode releases electrons, and forms one or more reaction products. Through this process, the anodes are gradually consumed.

The released electrons flow through a load to the cathode, where they react with one or more second reactants from an optional second reactant storage unit 28 or from some other source. The flow of electrons through the load gives rise to a voltage for the cells. When the cells are combined in series, the sum of the voltages for the cells forms the output of the power source.

The one or more reaction products can then be provided to optional reaction product storage unit 22 or to some other destination. The one or more reaction products, from unit 22 or some other source, can then be provided to optional regeneration unit 24, which regenerates fuel and/or one or more of the second reactants from the one or more reaction products. The regenerated fuel can then be provided to fuel storage unit 26, and/or the regenerated one or more second reactants can then be provided to optional second reactant storage unit 28 or to some other destination. As an alternative to regenerating the fuel from the reaction product using the optional regeneration unit 24, the fuel can be inserted into the system from an external source and the reaction product can be withdrawn from the system.

The optional reaction product storage unit 22 comprises a unit that can store the reaction product. Exemplary reaction product storage units include without limitation one or more tanks, one or more sponges, one or more containers, one or more vats, one or more barrels, one or more vessels, and the like, and suitable combinations of any two or more thereof. Optionally, the optional reaction product storage unit 22 is detachably attached to the system.

The optional regeneration unit 24 comprises a unit that can electrolyze the reaction product(s) back into fuel (e.g., hydrogen, metal particles and/or metal-coated particles, and the like) and/or second reactant (e.g., air, oxygen, hydrogen peroxide, other oxidizing agents, and the like, and suitable combinations of any two or more thereof). Exemplary regeneration units include without limitation water electrolyzers (which regenerate an exemplary second reactant (oxygen) and/or fuel (hydrogen) by electrolyzing water), metal (e.g., zinc) electrolyzers (which regenerate a fuel (e.g., zinc) and a second reactant (e.g., oxygen) by electrolyzing a reaction product (e.g., zinc oxide (ZnO)), and the like. Exemplary metal electrolyzers include without limitation fluidized bed electrolyzers, spouted bed electrolyzers, and the like, and suitable combinations of two or more thereof. The power source 20 can optionally function as the optional regeneration unit 24 by operating in reverse, thereby foregoing the need for a regeneration unit 24 separate from the power source 20. Optionally, the optional regeneration unit 24 is detachably attached to the system.

The fuel storage unit 26 comprises a unit that can store the fuel (e.g., for metal fuel cells, metal (or metal-coated) particles or liquid born metal (or metal-coated) particles or suitable combinations thereof; for hydrogen fuel cells, hydrogen or hydrogen containing compounds that can be reformed into a usable fuel prior to consumption). Exemplary fuel storage units include without limitation one or more tanks (for example, without limitation, a high-pressure tank for gaseous fuel (e.g., hydrogen gas), a cryogenic tank for liquid fuel which is a gas at operating temperature (e.g., room temperature) (e.g., liquid hydrogen), a metal-hydride-filled tank for holding hydrogen, a carbon-nanotube-filled tank for storing hydrogen, a plastic tank for holding potassium hydroxide (KOH) and metal (e.g., zinc (Zn), other metals, and the like) particles, and the like), one or more sponges, one or more containers (e.g., a plastic container for holding dry metal (e.g., zinc (Zn), other metals, and the like) particles, and the like), one or more vats, one or more barrels, one or more vessels, and the like, and suitable combinations of any two or more thereof. Optionally, the fuel storage unit 26 is detachably attached to the system.

The optional second reactant storage unit 28 comprises a unit that can store the second reactant. Exemplary second reactant storage units include without limitation one or more tanks (for example, without limitation, a high-pressure tank for gaseous second reactant (e.g., oxygen gas), a cryogenic tank for liquid second reactant (e.g., liquid oxygen) which is a gas at operating temperature (e.g., room temperature), a tank for a second reactant which is a liquid or solid at operating temperature (e.g., room temperature), and the like), one or more sponges, one or more containers, one or more vats, one or more barrels, one or more vessels, and the like, and suitable combinations of any two or more thereof. Optionally, the optional second reactant storage unit 28 is detachably attached to the system.

In one embodiment, the fuel cell utilized in the practice of the invention system is a metal fuel cell. The fuel of a metal fuel cell is a metal that can be in a form to facilitate entry into the cell cavities of the power source 20. For example, the fuel can be in the form of metal (or metal-coated) particles or liquid born metal (or metal-coated) particles or suitable combinations thereof. Exemplary metals for the metal (or metal-coated) particles include without limitation zinc, aluminum, lithium, magnesium, iron, and the like.

In this embodiment, when the fuel is optionally already present in the anode of the cell cavities in power source 20 prior to activating the fuel cell, the fuel cell is pre-charged, and can start-up significantly faster than when there is no fuel in the cell cavities and/or can run for a time in the range(s) from about 0.001 minutes to about 100 minutes without additional fuel being moved into the cell cavities. The amount of time which the fuel cell can run on a pre-charge of fuel within the cell cavities can vary with, among other factors, the pressurization of the fuel within the cell cavities, and alternative embodiments of this aspect of the invention permit such amount of time to be in the range(s) from about 1 second to about 100 minutes or more, and in the range(s) from about 30 seconds to about 100 minutes or more.

Moreover, the second reactant optionally can be present in the fuel cell and pre-pressurized to any pressure in the range(s) from about 0.01 psi gauge pressure to about 200 psi gauge pressure prior to a an outage sense time after the controller sensing the power outage condition to facilitate the fuel cell's start-up in a timeframe significantly faster than when there is no second reactant present and no pre-pressurization in the fuel cell prior to the optional controller sensing the power outage condition. Optionally, the one or more second reactants are present in the power source 20 at a time prior to an outage sense time, which outage sense time is in the range(s) from about 10 microseconds to about 10 seconds after the controller has sensed outage of primary power to the one or more loads system. Optionally, this time is also after the controller has sensed outage of primary power to the one or more loads.

Moreover, in this embodiment, one optional aspect provides that the volumes of one or both of the fuel storage unit 26 and the optional second reactant storage unit 28 can be independently changed as required to independently vary the energy of the system from its power, in view of the requirements of the system. Suitable such volumes can be calculated by utilizing, among other factors, the energy density of the system, the energy requirements of the one or more loads of the system, and the time requirements for the one or more loads of the system. In one embodiment, these volumes can vary in the range(s) from about 0.001 liters to about 1,000,000 liters.

In one aspect of this embodiment, at least one of, and optionally all of, the metal fuel cell(s) is a zinc fuel cell in which the fuel is in the form of fluid borne zinc particles immersed in a potassium hydroxide (KOH) electrolytic reaction solution, and the anodes within the cell cavities are particulate anodes formed of the zinc particles. In this embodiment, the reaction products can be the zincate ion, $Zn(OH)_4^{2-}$, or zinc oxide, $ZnO$, and the one or more second reactants can be an oxidant (for example, oxygen (taken alone, or in any organic or aqueous (e.g., water-containing) fluid (for example and without limitation, liquid or gas (e.g., air)), hydrogen peroxide, and the like, and suitable combinations of any two or more thereof). When the second reactant is oxygen, the oxygen can be provided from the ambient air (in which case the optional second reactant storage unit 28 can be excluded), or from the second reactant storage unit 28. Similarly, when the second reactant is oxygen in water, the water can be provided from the second reactant storage unit 28, or from some other source, e.g., tap water (in which case the optional second reactant storage unit 28 can be excluded).

In this embodiment, the particulate anodes are gradually consumed through electrochemical dissolution. In order to replenish the anodes, to deliver KOH to the anodes, and to facilitate ion exchange between the anodes and cathodes, a recirculating flow of the fuel borne zinc particles can be maintained through the cell cavities. This flow can be maintained through one or more pumps (not shown) or through some other means. As the potassium hydroxide contacts the zinc anodes, the following reaction takes place at the anodes:

$$Zn + 4OH^- \rightarrow Zn(OH)_4^{2-} + 2e^- \quad (1)$$

The two released electrons flow through a load to the cathode where the following reaction takes place:

$$\frac{1}{2}O_2 + 2e^- + H_2O \rightarrow 2OH^- \quad (2)$$

The reaction product is the zincate ion, $Zn(OH)_4^{2-}$, which is soluble in the reaction solution KOH. The overall reaction which occurs in the cell cavities is the combination of the two reactions (1) and (2). This combined reaction can be expressed as follows:

$$Zn + 2OH^- + \frac{1}{2}O_2 + H_2O \rightarrow Zn(OH)_4^{2-} \quad (3)$$

Alternatively, the zincate ion, $Zn(OH)_4^{2-}$, can be allowed to precipitate to zinc oxide, $ZnO$, a second reaction product, in accordance with the following reaction:

$$Zn(OH)_4^{2-} \rightarrow ZnO + H_2O + 2OH^- \quad (4)$$

In this case, the overall reaction which occurs in the cell cavities is the combination of the three reactions (1), (2), and (4). This overall reaction can be expressed as follows:

$$Zn + \frac{1}{2}O_2 \rightarrow ZnO \quad (5)$$

Under real world conditions, the reactions (4) or (5) yield an open-circuit voltage potential of about 1.4V. For additional information on this embodiment of a zinc/air battery, the reader is referred to U.S. Pat. Nos. 5,952,117; 6,153,329; and 6,162,555, which are hereby incorporated by reference herein as though set forth in full.

The reaction product $Zn(OH)_4^{2-}$, and also possibly $ZnO$, can be provided to reaction product storage unit 22. Optional regeneration unit 24 can then reprocess these reaction products to yield oxygen, which can be released to the ambient air or stored in second reactant storage unit 28, and zinc particles, which are provided to fuel storage unit 26. In addition, the optional regeneration unit 24 can yield water, which can be discharged through a drain or stored in second reactant storage unit 28. It can also regenerate hydroxide, $OH^-$, which can be discharged or combined with potassium to yield the potassium hydroxide reaction solution.

The regeneration of the zincate ion, $Zn(OH)_4^{2-}$, into zinc, and one or more second reactants can occur according to the following overall reaction:

$$Zn(OH)_4^{2-} \rightarrow Zn + 2OH^- + H_2O + \frac{1}{2}O_2 \quad (6)$$

The regeneration of zinc oxide, $ZnO$, into zinc, and one or more second reactants can occur according to the following overall reaction:

$$ZnO \rightarrow Zn + \frac{1}{2}O_2 \quad (7)$$

It should be appreciated that embodiments of metal fuel cells other than zinc fuel cells or the particular form of zinc fuel cell described above are possible for use in a system according to the invention. For example, aluminum fuel cells, lithium fuel cells, magnesium fuel cells, iron fuel cells, and the like are possible, as are metal fuel cells where the fuel is not in particulate form but in another form such as sheets or ribbons or strings or slabs or plates. Embodiments are also possible in which the fuel is not fluid borne or continuously recirculated through the cell cavities (e.g., porous plates of fuel, ribbons of fuel being cycled past a reaction zone, and the like). It is also possible to avoid an electrolytic reaction solution altogether or at least employ reaction solutions besides potassium hydroxide, for example, without limitation, sodium hydroxide, inorganic alkalis, alkali or alkaline earth metal hydroxides. See, for example, U.S. Pat. No. 5,958,210, the entire contents of which are incorporated herein by this reference. It is also possible to employ metal fuel cells that output AC power rather than DC power using an inverter, a voltage converter, and the like.

In a second embodiment of a fuel cell useful in the practice of the invention system, the fuel used in the electrochemical reaction that occurs within the cells is hydrogen, the second reactant is oxygen, and the reaction product is water. In one aspect, the hydrogen fuel is maintained in the fuel storage unit 26, but the second reactant storage unit 28 can be omitted and the oxygen used in the electrochemical reaction within the cells can be taken from the ambient air. In another aspect, the hydrogen fuel is maintained in the fuel storage unit 26, and the oxygen is maintained in the second reactant storage unit 28. In addition, the optional reaction product storage unit 22 can be included or omitted, and the water resulting from discharge of the unit simply discarded or stored in the reaction product storage unit 22 (if present), respectively. Later, the optional regeneration unit 24 can regenerate water from another source, such as tap water, or from the reaction product storage unit 22 (if present) into hydrogen and oxygen. The hydrogen can then be stored in fuel storage unit 22, and the oxygen simply released into the ambient air or maintained in the second reactant storage unit 28.

In a third embodiment of a fuel cell useful in the practice of the invention system, a metal fuel cell system for providing backup power to one or more loads (including without limitation a cooling unit) upon the occurrence of a power outage condition is provided. Such system is characterized in that it has one, or any suitable combination of two or more, of the following properties: the system optionally can be configured to not utilize or produce significant quantities of flammable fuel or product, respectively; the system can provide backup power to the one or more loads for an amount of time limited only by the amount of fuel present (e.g., in the range(s) from about 0.01 hours to about 10,000 hours or more, and in the range(s) from about 0.5 hours to about 650 hours, or more); the system optionally can be configured to have an energy density in the range(s) from about 35 Watt-hours per kilogram of combined fuel and electrolyte added to about 400 Watt-hours per kilogram of combined fuel and electrolyte added; the system optionally can further comprise an energy requirement and can be configured such that the combined volume of fuel and electrolyte added to the system is in the range(s) from about 0.0028 L per Watt-hour of the system's energy requirement to about 0.025 L per Watt-hour of the system's energy requirement, and this energy requirement can be calculated in view of, among other factors, the energy requirement(s) of the one or more load(s) comprising the system (In one embodiment, the energy requirement of the system can be in the range(s) from 50 Watt-hours to about 500,000 Watt-hours, whereas in another embodiment, the energy requirement of the system can be in the range(s) from 5 Watt-hours to about 50,000,000 Watt-hours); the system optionally can be configured to have a fuel storage unit that can store fuel at an internal pressure in the range(s) from about −5 pounds per square inch (psi) gauge pressure to about 200 psi gauge pressure.

An advantage of fuel cells relative to traditional power sources such as lead acid batteries is that they can provide longer term backup power more efficiently and compactly. This advantage stems from the ability to continuously refuel the fuel cells using fuel stored with the fuel cell, from some other source, and/or regenerated from reaction products by the optional regeneration unit 24. In the case of the zinc fuel cell, for example, the duration of time over which energy can be provided is limited only by the amount of fuel which is initially provided in the fuel storage unit, which is fed into the system during replacement of a fuel storage unit 26, and/or which can be regenerated from the reaction products that are produced. Thus, the system, comprising at least one fuel cell that comprises an optional regeneration unit 24 and/or a replaceable fuel storage unit 26, can provide backup power to the one or more loads for a time in the range(s) from about 0.01 hours to about 10000 hours, or even more. In one aspect of this embodiment, the system can provide back-up power to the one or more loads for a time in the range(s) from about 0.5 hours to about 650 hours, or even more.

Moreover, a system in accordance with the invention optionally can be configured to expel substantially no reaction product(s) outside of the system (e.g., into the environment).

Figure 1C:
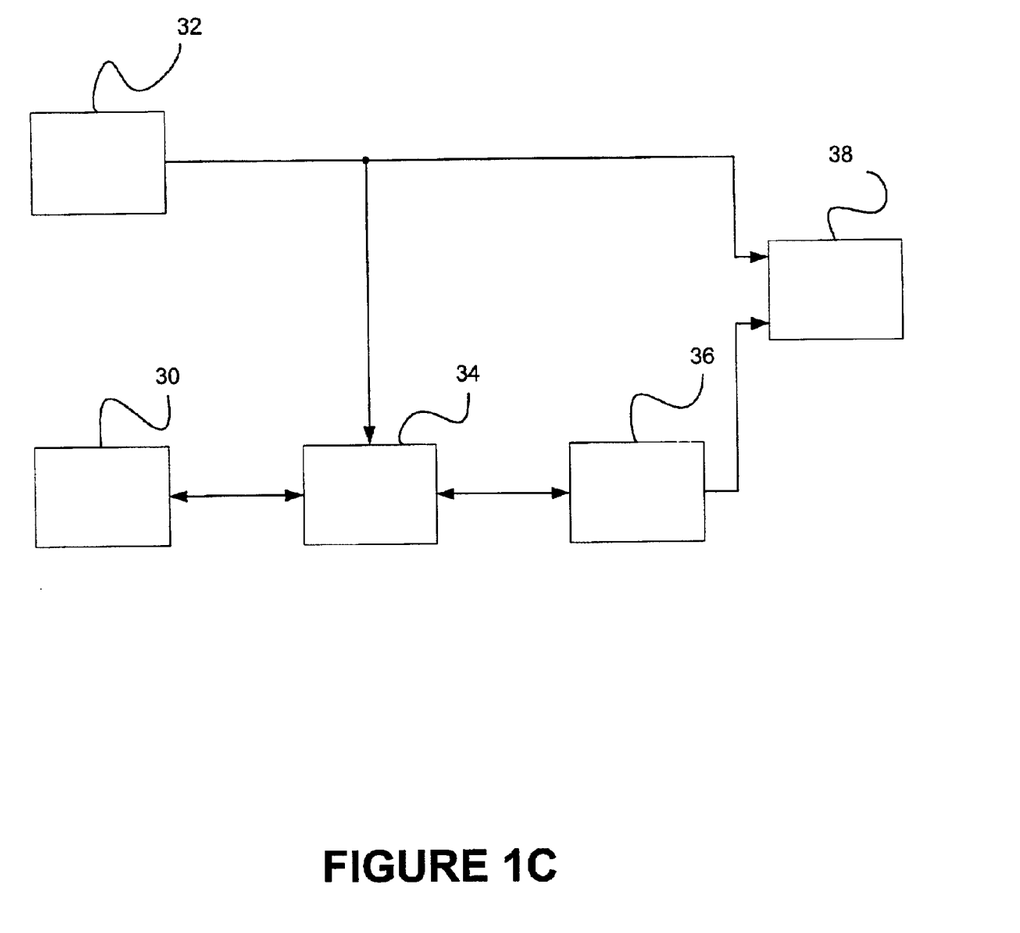
FIG. 1C is a block diagram of a fuel cell system including a controller for operatively engaging the fuel cell to provide power to one or more loads upon the occurrence of a power outage condition.

Referring to FIG. 1C, a further optional component comprising the system, a controller 34, upon sensing the occurrence of a power outage condition, operatively engages the one or more metal fuel cells 30 to provide power (i.e., backup power) to the one or more loads 38. When there is a resumption of primary power to the one or more loads 38, the controller 34 senses this condition, and disengages the one or more fuel cells 30 from powering the one or more loads 38. Optionally the controller 34 sensing the resumption of delivery of primary power to the one or more loads 38 then engages the primary power 32 to provide power to the one or more regeneration units (if present) in the one or more fuel cells 30 so as to regenerate the reaction products stored in the fuel cells 30 back into fuel for reuse. Further, the controller 34 optionally can be configured to engage flow of the one or more second reactants into the power source responsive to sensing the outage of primary power to the one or more loads 38. Suitable controllers include without limitation human operator(s), mechanical sensing device(s), computer-operated sensing device(s), robotic sensing device(s), electrical sensing device(s), solid state electronic switch(es), electromechanical switch(es), and the like, and suitable combinations of any two or more thereof.

An optional power conversion unit 36 can also be provided as a component of the system, depending on the nature and characteristics of the one or more loads 38, and the one or more fuel cells 30. The optional power conversion unit 36 comprises a unit that can convert power from one form (e.g., direct current, or DC, form; alternating current, or AC, form; and the like) to another form. Exemplary power conversion units include one or more voltage converter(s), one or more inverter(s), one or more DC to DC converter(s), and the like, and suitable combinations of any two or more thereof. The optional power conversion unit 36 functions to convert the power output from the fuel cell 30 to another form or, optionally, in the case of supply of power from the primary source 32 to the optional regeneration unit, power from the primary source 32 to another form for regeneration purposes. In one embodiment, the optional power conversion unit 36 operates to convert the DC power provided by the one or more fuel cells 30 to AC power. In another embodiment, the optional power conversion unit 36 operates to convert the DC power provided by the one or more fuel cells to another form of DC power.

The invention system further comprises a cooling unit that is powered by the one or more fuel cells upon the occurrence of a power outage condition. This cooling unit is configured to remove from the vicinity of the system heat generated by the one or more loads (including without limitation the cooling unit) and/or the one or more fuel cells, optionally via utilization of one or more cooling fluids. Exemplary cooling units include without limitation heat exchangers, fans, absorption chillers, phase-change coolers, air conditioners, heat sinks, other passive and active units that function to remove heat, means for cooling loads, and the like, and suitable combinations of any two or more thereof. Cooling fluids include without limitation gases, liquids, and suitable combinations thereof that can absorb and release heat, as required, under suitable operating conditions to assist in the operation of the cooling unit to remove from the vicinity of the system heat generated by the one or more loads (including without limitation the cooling unit) and/or the one or more fuel cells.

In one implementation, the system of the invention further optionally comprises means for physically supporting the one or more fuel cells, and at least one of the one or more loads. Optionally, the means for supporting can be configured to support one or more of the remaining components of the system, including without limitation the remainder of the one or more loads, the optional controller, and/or the optional power conversion stage. Such means for supporting include, without limitation, one or more rack(s), one or more shelf(ves), one or more stands, one or more tables, one or more apparatus that can support one or more components of the system of the invention, and the like, and suitable combinations of any two or more thereof.

In another implementation, the system of the invention further optionally comprises means for routing a cooling fluid, whether gas, liquid, or both gas and liquid, past the one or more fuel cells and/or the one or more loads. Such means for routing include, without limitation, one or more conduits, one or more pipes, one or more pumps, one or more exhaust vents, one or more reservoirs, one or more storage tanks, one or more ducts, one or more plenums, one or more openings, one or more channels, one or more tubes, and the like, and suitable combinations of any two or more thereof.

Each of these two means, as well as each of the other components of the system, can be separate from, or integral with, one or more of the other components of the system.

In accordance with the invention, there is also provided a method of providing backup power to one or more loads and to a cooling unit upon the occurrence of and throughout the duration of a power outage condition. The method comprises, upon the occurrence of the power outage condition, engaging one or more fuel cells (a) to provide backup power to one or more loads, and, (b) either simultaneously with step (a), preceding step (a), or subsequent to step (a), to provide backup power to a cooling unit. The method further comprises, for the substantial duration of the power outage condition, engaging the cooling means to cool both the one or more loads and/or the one or more fuel cells sufficiently to allow both to dissipate heat and continuing function of the one or more loads and/or the one or more fuel cells.

Embodiments of Systems According to the Invention

Referring back to FIG. 1A, a cooling unit 6 is powered by the one or more fuel cells 2 upon the occurrence of a power outage condition. The cooling unit 6 in this embodiment is a fan or other suitable means which intakes cooling fluid (e.g., cool air), identified in FIG. 1A with numerals 8a and 8b, and blows it past the one or more fuel cells 2 and the one or more loads 4a, 4b, 4c, 4d. The cooling fluid (e.g., cool air) blows past these devices and cools them in the process. The resulting exhausted cooling fluid (e.g., warm exhaust air), identified with numeral 10, exits the system through an exhaust hose 16. In an alternative embodiment, the cooling unit 6 can draw cooling fluid (e.g., cool air) from outside of the enclosed space occupied by the fuel cells 2 and the one or more loads 4a, 4b, 4c, 4d (e.g., through an open door, vent, other exit or the like), through at least part of the system past these devices, and back to the outside of the enclosed space (e.g., through an open door, vent, other exit or the like).

In one implementation, the one or more fuel cells 2 and at least one of the one or more loads 4a, 4b, 4c, and 4d, and optionally the remainder of the one or more loads 4a, 4b, 4c, and 4d and the cooling unit 6, can be physically supported by a suitable means for physically supporting such components. In this implementation, the illustrated means is a rack, identified in the figure with numeral 18. In this implementation, the system can be located in a room, and the cooling means 6 can be configured to draw the cooling fluid (e.g., cool air) 8a and 8b from the room into the system through intake 19. The exhaust hose 16 in this implementation can extend through a ceiling or plenum 12 so that the resulting exhausted cooling fluid (e.g., warm exhaust air) 10 is allowed to exit the room.

Figure 2:
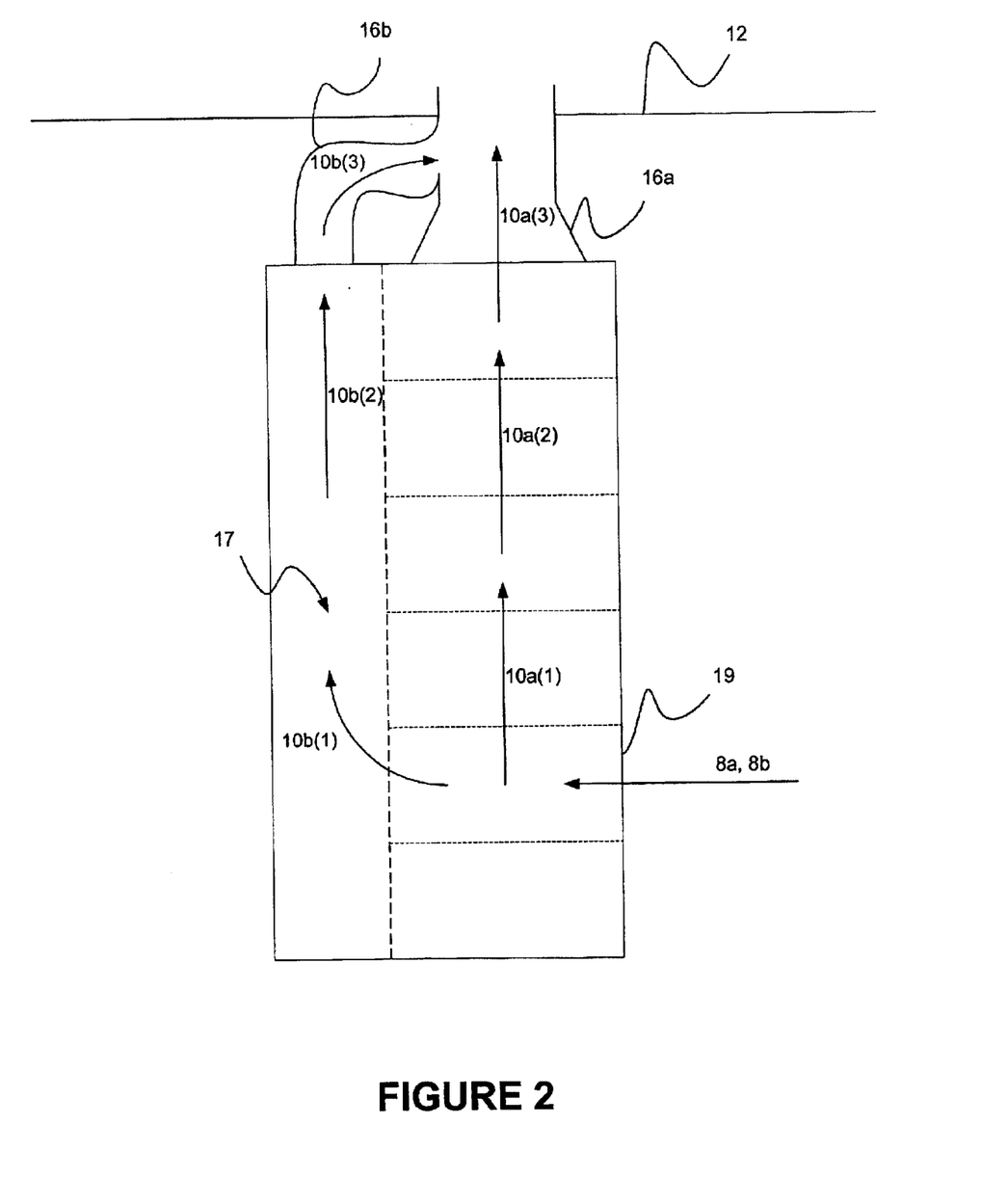
FIG. 2 is a side view of the embodiment illustrated in FIG. 1A.

A side view of this implementation is illustration in FIG. 2. As illustrated, cooling fluid (e.g., cool air) 8a, 8b is drawn into the system through intake 19. Some of this cooling fluid (e.g., cool air) is directed upwards past the one or more loads 4a, 4b, 4c, 4d. The resulting exhausted cooling fluid (e.g., warm exhaust air) from the one or more loads 4a, 4b, 4c, 4d, identified with numerals 10a(1), 10a(2), and 10a(3), exits the system and room through portion 16a of the exhaust hose. The remaining portion of the incoming cooling fluid (e.g., cool air) is directed past the one or more fuel cells 2. The resulting exhausted cooling fluid (e.g., warm exhaust air) from the one or more loads 4a, 4b, 4c, 4d, identified with numerals 10b(1), 10b(2), and 10b(3), is directed into chamber 17, whereupon it is directed upwards, and exits the system and room through portion 16b of the exhaust hose.

Figure 3:
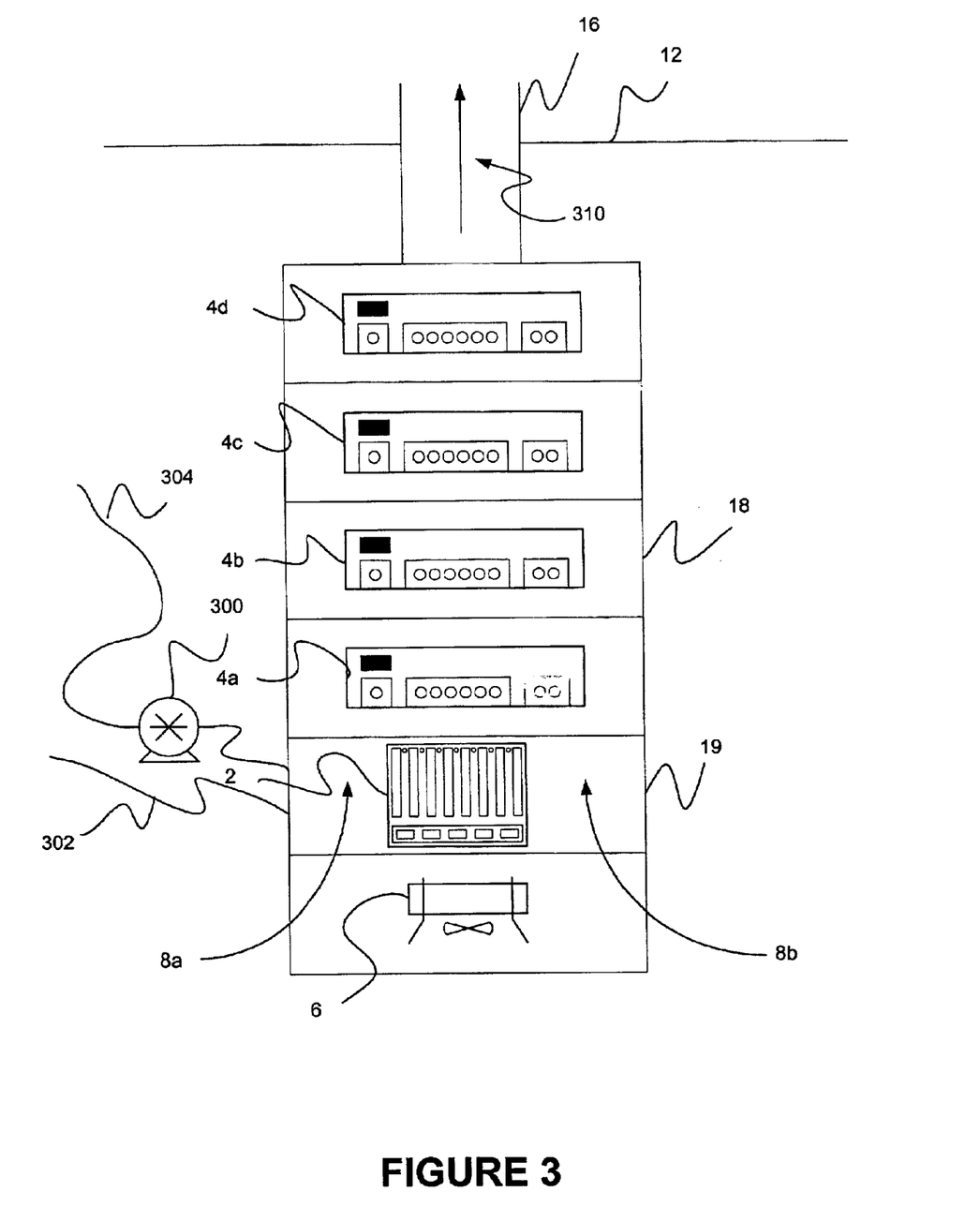
FIG. 3 is a front view of a second embodiment of a fuel cell system according to the invention in which the cooling fluid is air cooled by a liquid coolant provided from an open loop system.
Figure 4:
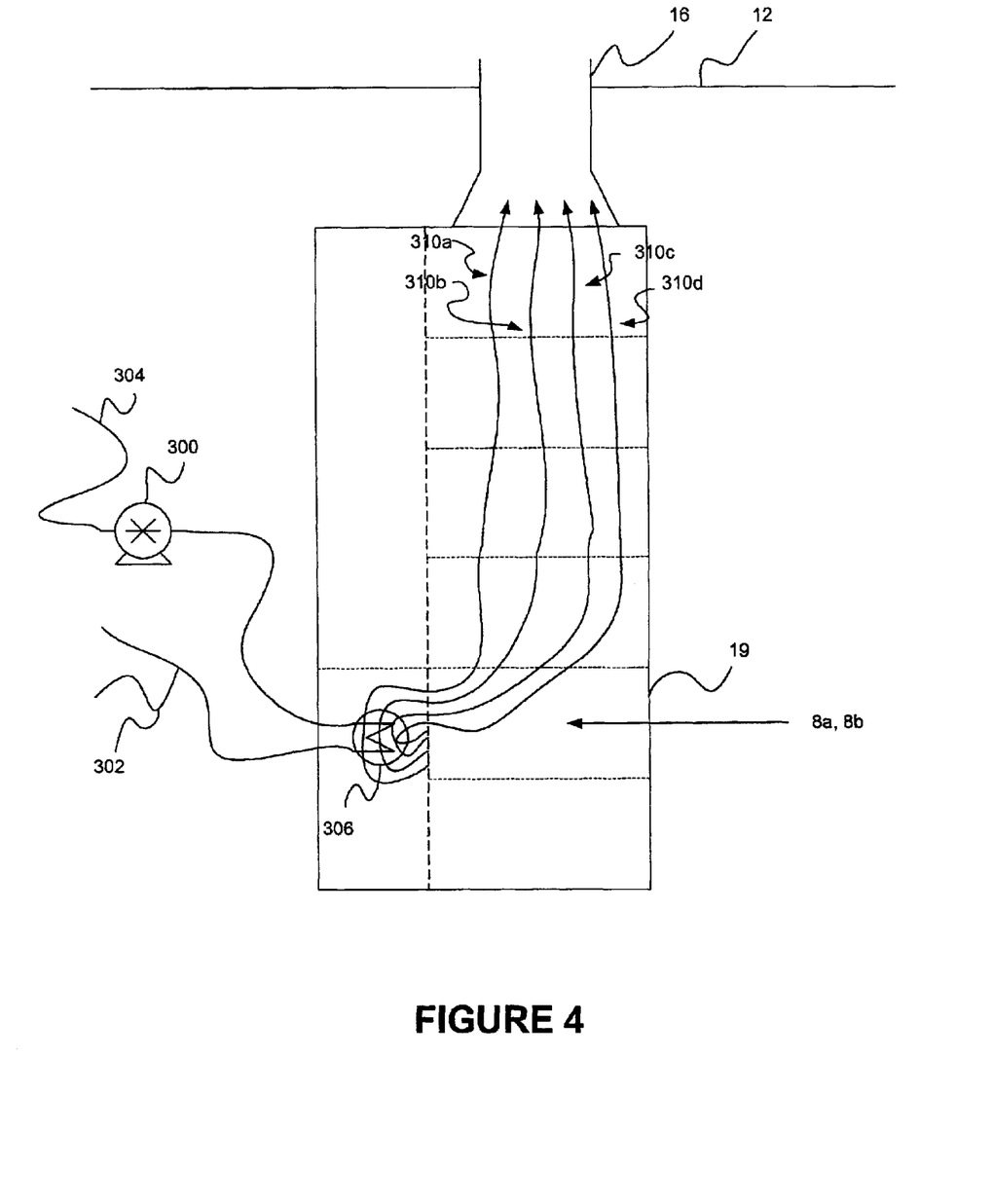
FIG. 4 is a side view of the embodiment illustrated in FIG. 3.

A front view of a second embodiment of a system according to the invention is illustrated in FIG. 3. A side view is illustrated in FIG. 4. In this embodiment, a first cooling fluid (e.g., cool air) 8a, 8b is again drawn into the system through intake 19 by means of a cooling unit (e.g., fan 6 or other equivalent means). The first cooling fluid (e.g., cool air) is directed past the one or more fuel cells 2. The resulting exhausted first cooling fluid (e.g., warm exhaust air) is then directed past a second cooling unit (e.g., heat exchanger 306). A second cooling fluid (e.g., liquid coolant) from a source (not shown) external to the system is pumped by means of pump 300 through conduit 304, and then through the second cooling unit (e.g., heat exchanger 306). The second cooling fluid (e.g., liquid coolant) is then directed from the second cooling unit (e.g., heat exchanger 306) through conduit 302 to a destination (not shown) external to the system. This process cools the exhausted first cooling fluid (e.g., warm exhaust air) as it passes through second cooling unit (e.g., heat exchanger 306). The regenerated first cooling fluid (e.g., cooled air), which is identified in the figure with numerals 310a, 310b, 310c, and 310d, is then directed past the one or more loads 4a, 4b, 4c, 4d. This process cools the loads and again results in exhausted first cooling fluid (e.g., warm exhaust air), which is directed out of the system through exhaust tube 16.

In one implementation of this embodiment, a means 18 for physically supporting the loads 4a, 4b, 4c, 4d, the one or more fuel cells 2, and the cooling unit 6 is also provided. In one example, this physical support means is a rack, but it should be appreciated that other examples are possible.

Also, the exhaust tube 16 can pass through a ceiling or plenum 12 of the room in which the system is present so that the exhausted first cooling fluid (e.g., warm exhaust air) 310a, 310b, 310c, 310d is directed out of the room.

In this embodiment, the system for passing the second cooling fluid (e.g., liquid coolant) through the second cooling unit (e.g., heat exchanger 306) can be open loop, meaning that the external source from which the second cooling fluid (e.g., liquid coolant) is derived can be different from the destination of the second cooling fluid (e.g., liquid coolant). For example and without limitation, the second cooling fluid (e.g., liquid coolant) can be tap water from a faucet or the like, and the destination for the second cooling fluid (e.g., liquid coolant, such as tap water from a faucet or the like), after it has passed through the second cooling unit (e.g., heat exchanger 306), can be a drain.

Figure 5:
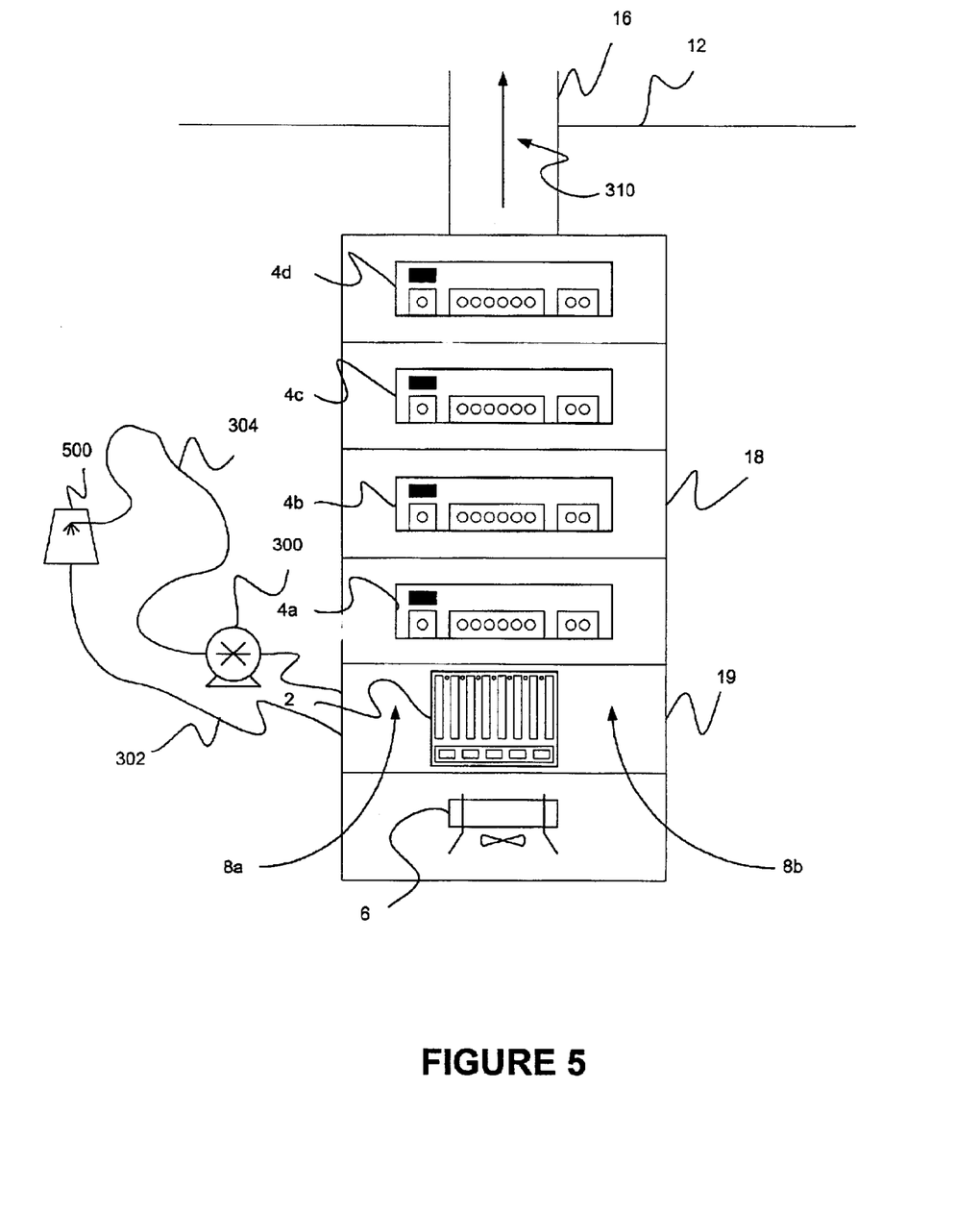
FIG. 5 is a front view of a third embodiment of a fuel cell system according to the invention in which the cooling fluid is air cooled by a liquid coolant provided from a closed loop system.
Figure 6:
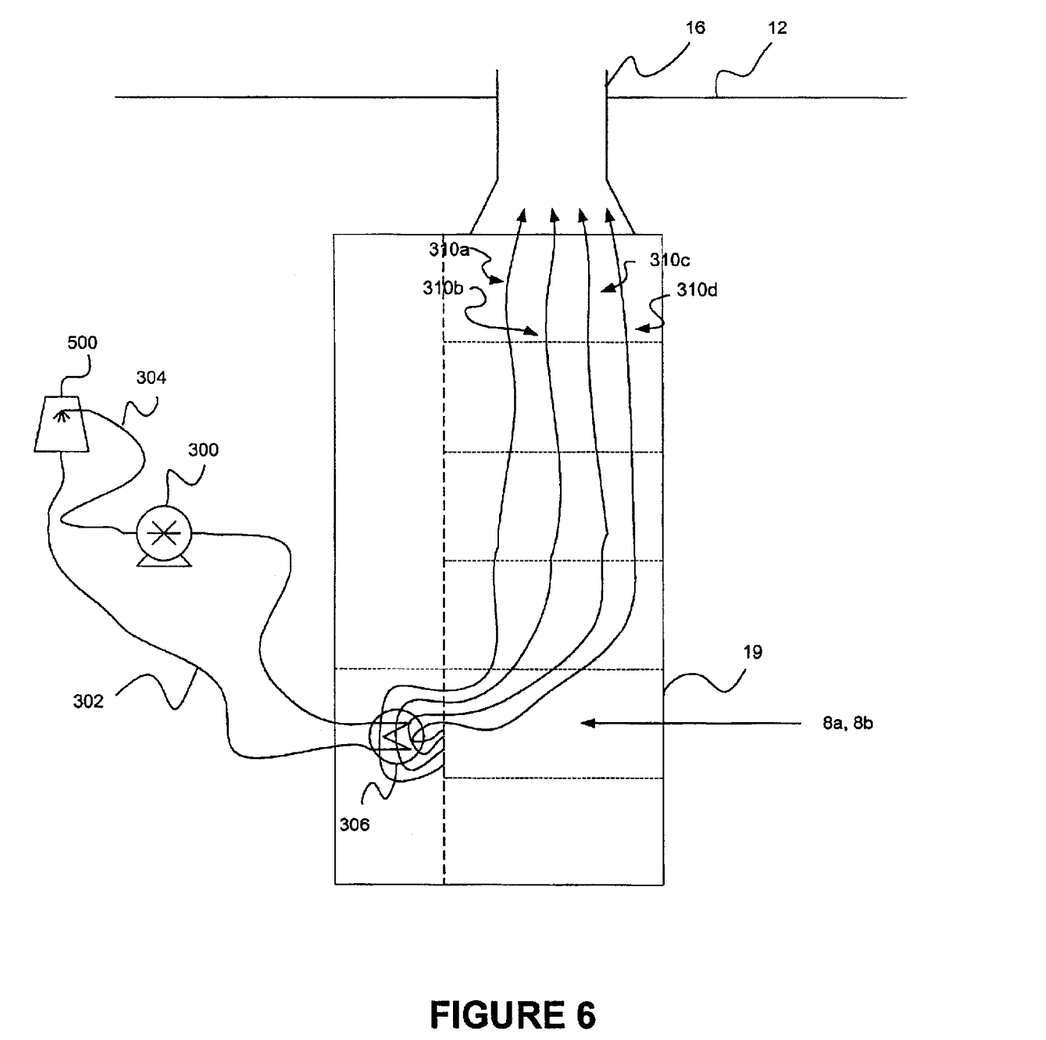
FIG. 6 is a side view of the embodiment illustrated in FIG. 5.

A front view of a third embodiment of a system according to the invention is illustrated in FIG. 5. A side view of this embodiment is illustrated in FIG. 6. This embodiment is similar to the previous embodiment, except that the system for passing second cooling fluid (e.g., liquid coolant)

through second cooling unit (e.g., heat exchanger 306) is a closed loop system where the source and destination of the second cooling fluid (e.g., liquid coolant) is reservoir or storage tank 500. In one example, the liquid coolant is water. In another example, it is ethylene glycol.

Figure 6A:
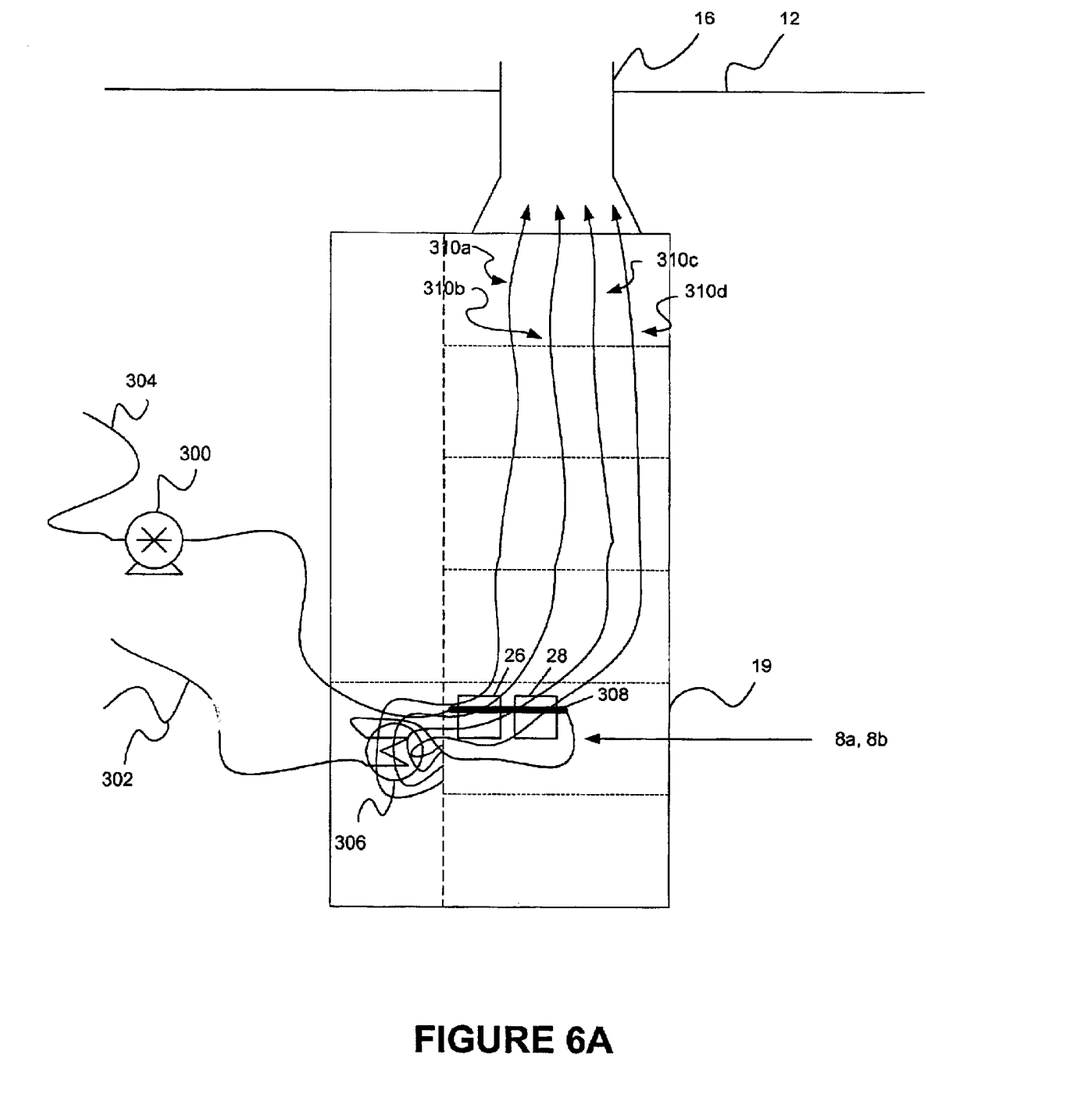
FIG. 6A is a side view of a fourth embodiment of a fuel cell system according to the invention in which the cooling fluid is circulated through the fuel storage unit and/or reaction product storage unit of the fuel cell.

A fourth embodiment of a system according to the invention is illustrated in FIG. 6A. This embodiment is similar to the previous two embodiments, except that in this system, the second cooling fluid (e.g., gaseous or liquid coolant) is circulated through a tube 308 routed through the fuel storage unit 26 and/or the reaction product unit 28 so as to remove heat from the reaction product(s), the fuel, and/or the fluid carrying the fuel (e.g., the electrolyte in the case of a zinc fuel cell). The second cooling fluid (e.g., gaseous or liquid coolant) is then discarded or passed to a second cooling unit (e.g., heat exchanger 306) or reservoir external to the system.

Figure 7:
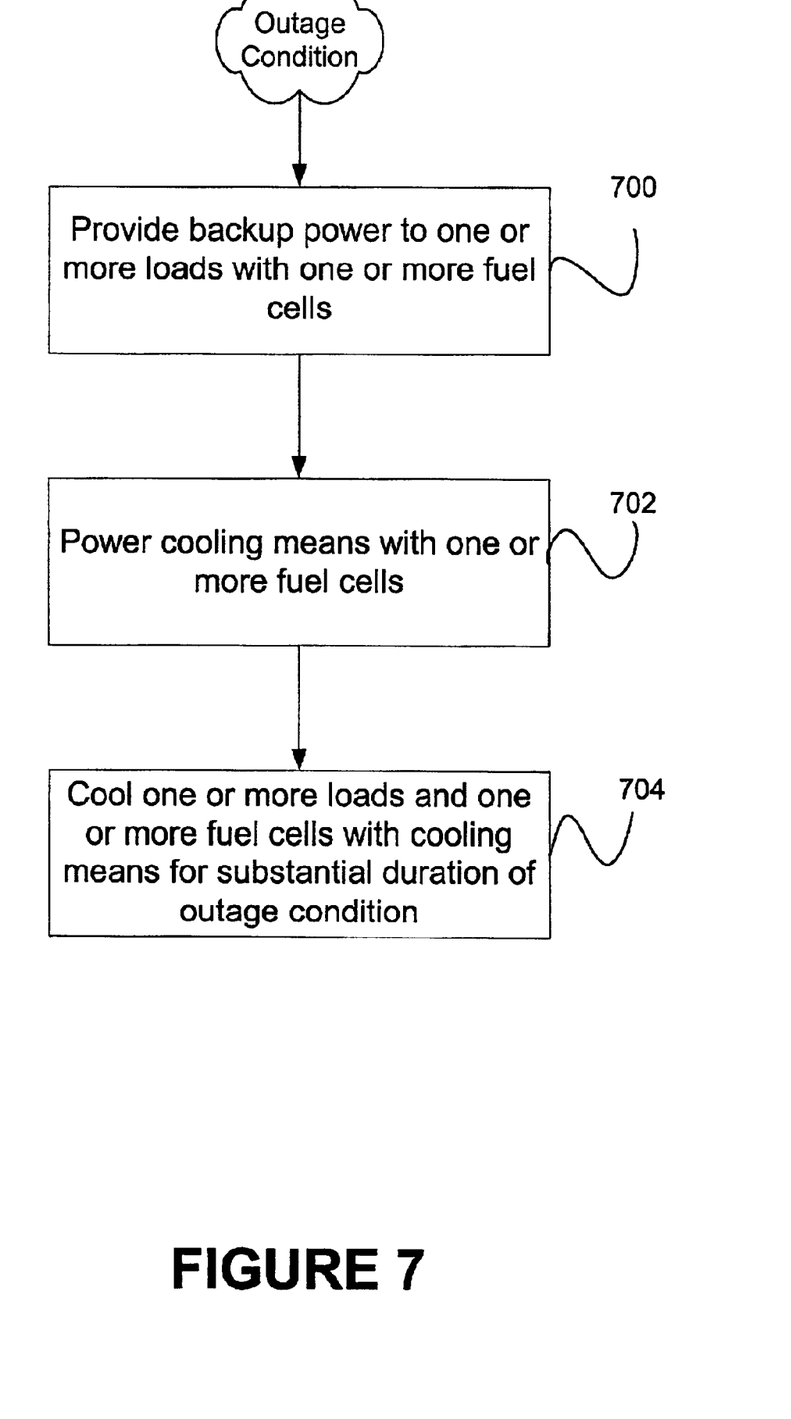
FIG. 7 is a flowchart of an embodiment of a method according to the invention.

A method of operation according to the invention is illustrated in FIG. 7. As illustrated, the method is performed upon the occurrence of and throughout the duration of a power outage condition. The method begins with step 700, where, upon the occurrence of the power outage condition, one or more fuel cells are engaged to provide backup power to one or more loads. Step 702 is then performed. In step 702, again upon the occurrence of a power outage condition, the one or more fuel cells are engaged to power up a cooling means. Step 704 is then performed. In step 704, for the substantial duration of the power outage condition, the cooling unit is engaged to cool both the one or more loads and the one or more fuel cells sufficiently to allow both to dissipate heat and function.

In a further embodiment, the invention provides methods of pre-charging a fuel cell system for providing backup power to one or more loads (including without limitation a cooling unit). Such methods comprise placing an amount of fuel in cell cavities of a power source of a fuel cell system prior to operative engagement of the fuel cell system. This amount of fuel can be sufficient to operatively engage the fuel cell system for a time in the range(s) from about 0.001 minutes to about 100 minutes without additional fuel being added thereto. Optionally, the fuel is kept in the cell cavities for a time prior to operative engagement of the fuel cell system in the range(s) from about 0.001 minutes to about 10 years or more.

In another embodiment, the invention provides methods of utilizing a precharged fuel cell system for providing backup power to one or more loads (including without limitation a cooling unit). Such methods comprise operatively engaging a fuel cell system, containing fuel in cell cavities of a power source of the fuel cell system prior to its operative engagement, for a time in the range(s) from about 0.001 minutes to about 100 minutes without adding additional fuel thereto.

As utilized herein, the term "about" comprises any deviation upward or downward from the value modified by "about" by up to 20% of such value.

As employed herein, the term "in the range(s)" comprises the range defined by the values listed after the term "in the range(s)", as well as any and all subranges contained within such range, where each such subrange is defined as having as a first endpoint any value in such range, and as a second endpoint any value in such range that is greater than the first endpoint and that is in such range.

As utilized herein, the term "significantly faster" comprises any increase in the time value modified by "significantly faster" that is in the range(s) greater than 10% of such time value.

While various embodiments of the invention have been described, it will be apparent to those of ordinary skill in the art that many more embodiments and implementations are possible that are within the scope of this invention.

What is claimed is:

1. A fuel cell system for providing backup power to one or more loads comprising:

one or more fuel cells, each comprising a power source and a fuel storage unit;

a cooling unit that is powered by the one or more fuel cells upon the occurrence of a power outage condition; and a controller for sensing outage of primary power to the one or more loads, and, responsive thereto, operatively engaging the one or more fuel cells to provide power to the one or more loads and the cooling unit, wherein at least one of the power sources comprises fuel that is present in cell cavities of the power source prior to the controller sensing the outage of primary power to the one or more loads, and wherein the at least one of the power sources further comprises one or more second reactants that are present in the power source at a pressure in the range from about 0.01 psi gauge pressure to about 200 psi gauge pressure prior to operative engagement of the one or more fuel cells by the controller to provide power to the one or more loads, and wherein the one or more second reactants are present in the power source at the pressure at a time prior to an outage sense time, which outage sense time is in the range from about 10 microseconds to about 10 seconds after the controller has sensed outage of primary power to the one or more loads, and wherein the cooling unit comprises an open loop system configured to cool a first cooling fluid by circulating a second cooling fluid through a heat exchanger, and to then circulate the cooled first cooling fluid past the one or more fuel cells and/or the one or more loads.

2. A fuel cell system for providing backup power to one or more loads comprising:

one or more fuel cells, each comprising a power source and a fuel storage unit;

a cooling unit that is powered by the one or more fuel cells upon the occurrence of a power outage condition; and a controller for sensing outage of primary power to the one or more loads, and, responsive thereto, operatively engaging the one or more fuel cells to provide power to the one or more loads and the cooling unit, wherein at least one of the power sources comprises fuel that is present in cell cavities of the power source prior to the controller sensing the outage of primary power to the one or more loads, and wherein the at least one of the power sources further comprises one or more second reactants that are present in the power source at a pressure in the range from about 0.01 psi gauge pressure to about 200 psi gauge pressure prior to operative engagement of the one or more fuel cells by the controller to provide power to the one or more loads, and wherein the one or more second reactants are present in the power source at the pressure at a time prior to an outage sense time, which outage sense time is in the range from about 10 microseconds to about 10 seconds after the controller has sensed outage of primary power to the one or more loads, and wherein the cooling unit comprises a closed loop system configured to cool a first cooling fluid by circulating a second cooling fluid from a reservoir through a heat exchanger and then back to the reservoir, and to then circulate the cooled first cooling fluid past the one or more fuel cells and/or the one or more loads.

3. A method of providing backup power to one or more loads and to a cooling unit, upon the occurrence of and throughout the duration of a power outage condition, the method comprising, upon the occurrence of the power outage condition, engaging one or more fuel cells to provide backup power to (a) one or more loads, and, (b) either simultaneously, precedingly, or subsequently, a cooling unit to cool both the one or more loads and the one or more fuel cells sufficiently to allow both to dissipate heat and to continue functioning.

* * * * *